Jan. 17, 1961  A. A. TESSMAN  2,968,101
BOWLING BALL GRIP MEASURING MEANS
Filed Oct. 10, 1958  2 Sheets-Sheet 1
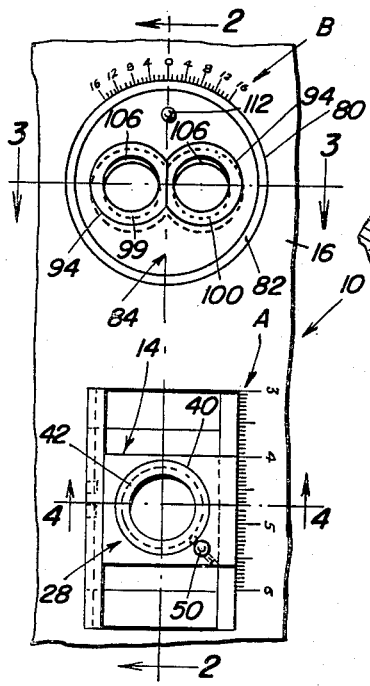
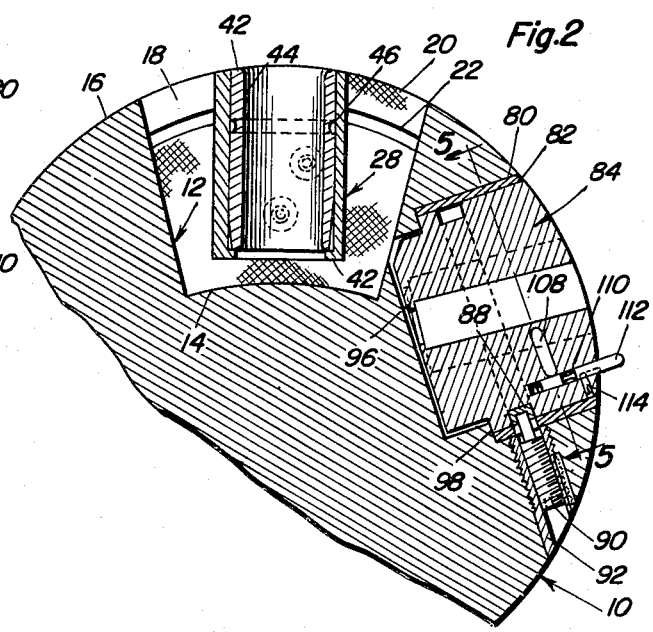
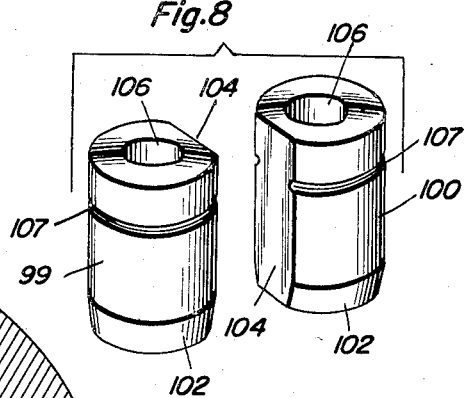
Arno A. Tessman
INVENTOR.

Jan. 17, 1961    A. A. TESSMAN    2,968,101
BOWLING BALL GRIP MEASURING MEANS
Filed Oct. 10, 1958    2 Sheets-Sheet 2
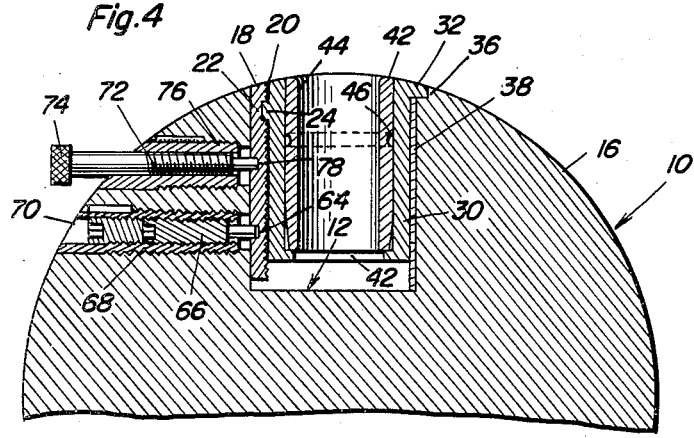
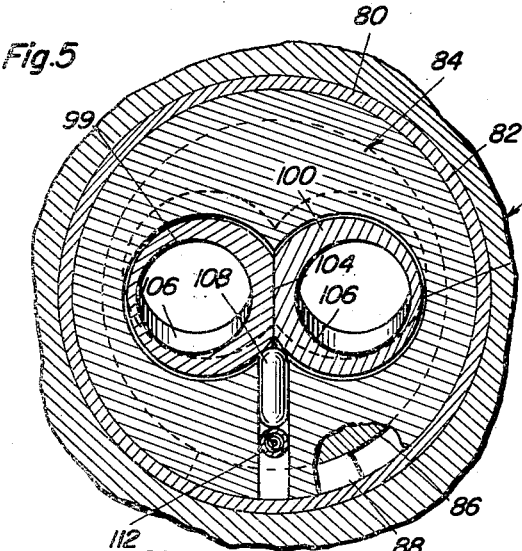
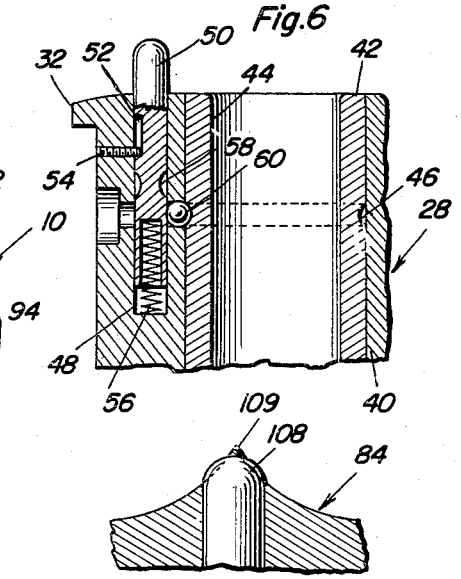
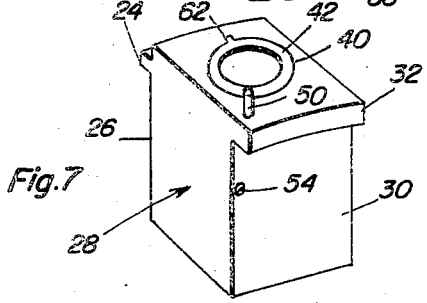
Arno A. Tessman
INVENTOR.

United States Patent Office 2,968,101
Patented Jan. 17, 1961

2,968,101

BOWLING BALL GRIP MEASURING MEANS

Arno A. Tessman, 1736 E. Commerce St.,
San Antonio, Tex.

Filed Oct. 10, 1958, Ser. No. 766,467

4 Claims. (Cl. 33—174)

The present invention relates to structurally novel and improved measuring means which is expressly made and suitably adapted to be incorporated in a hard rubber conventional-type bowling ball, a trial or dummy ball for example, which, with the means incorporated, may be picked up and swung by the particular bowler to make sure that the measurements which have been ascertained and established and that the grip which has been determined upon is regarded as most natural and comfortable for his particular hand.

Pursuant to the foregoing purpose, a measurement taking ball is provided with reliable and prerequisite facilities for accurate accommodation of the thumb and fingers of a given or particular hand so that the ball may be picked up and held with a restful easy grip without strained muscles and released easily in keeping with the expected needs of the hand of the user thereof. It follows that the improved ball with its unique and reliable gripping and measuring facilities and measuring scale serves to furnish particularized information which can then be recorded and be utilized as a guide for drilling thumb and finger holes in a ball which is to be expressly adapted to the prospective owner's peculiar grip as to hand span positions as well as pitch of the thumb and fingers holes if desired.

It is a matter of common knowledge that others engaged in the line of endeavor herein under consideration have offered a hand measuring ball for use in accurately measuring a bowler's hand and to provide a pattern for the drilling of the hole for the thumb and holes for the fingers and, generally speaking, prescribed objectives have to do with the span between the thumb and individual fingers, the relative position of the fingers to the thumb and the pitch of the several holes. The present invention is such in construction and adaptability that it likewise is intended to serve the purposes for which it has been devised and also the manufacturing requirements and economies of manufacturers of measuring balls. However, many prior art constructions appear not to have met with widespread adoption and use, because of the natural reluctance to use complex measurement procedures requiring a plurality of interdependent measurements and scale readings. Also, such prior devices required prolonged gripping by the user in order to obtain the measurement data which was consequently rendered inaccurate because of the user's difficulty in maintaining a constant grip. The complexities and discomfort to the user above referred to is therefore eliminated by the novel arrangement embodied in this invention.

In carrying out the instant invention I use a dummy ball of requisite weight and character, taking into consideration the over-all weight of the facilities incorporated for measuring needs. This ball is provided with a thumb sleeve or stall, the bore of which is of requisite gauge for the thumb of said bowler, a first adapter block slidingly keyed in a recess provided therefor in the surface portion of said ball, said block having a socket for removable reception and retention of said stall and which always maintains the same angular pitch relative to the ball's center, and adjustably locked in a position by a detent in laterally disposed relation thereto, a second adapter block mounted in a recess provided therefor in said ball and bored and providing a socket, finger stalls removably mounted in said socket, said stalls having finger holes therein of predetermined size and gauge for said bowler's fingers, said first block being slidable freely upon release of the detent toward and from the second block to fit the span of the bowler's hand, measuring scales provided on the ball surface for ascertaining the given selected positions of the first block, and means on the ball cooperating with the two blocks for securing the same so that measurements may be taken and suitably recorded for subsequent use and also so that the user may pick the ball up and handle it to make sure that the measurements which are to be relied upon are in keeping with the particular requirements.

Other and more specific objects and features of the invention will become apparent from the following specification and the accompanying drawings.

In the drawings therein like numerals are employed to designate like parts throughout the views:

Fig. 1 is a fragmentary plan view of the bowling ball, that is the surface portion thereof which is provided with the measurement showing and taking facilities; namely, the thumb-accommodating means and the finger-accommodating means toward and from which the thumb-accommodating means is shiftable or slidable.

Fig. 2 is an enlarged sectional view taken approximately on the plane of the line 2—2 of Fig. 1, looking in the direction of the arrows.

Figs. 3 and 4 are sections on the section lines 3—3 and 4—4 respectively of Fig. 1.

Fig. 5 is an exaggerated horizontal section on the plane of the line 5—5 of Fig. 2.

Fig. 6 is a fragmentary sectional and elevational view detailing the latch bolt or retaining means for the sliding thumb block (the latch bolt for the finger stalls block being the same).

Fig. 7 is a perspective view of the aforementioned slidable thumb block.

Fig. 8 is a perspective view of the sleeve-like finger stalls bracketed or grouped in paired relationship.

Fig. 9 is an exaggerated detail view in section and elevation showing a bullet-like detent seen best in Fig. 5.

The dummy or trial bowling ball is denoted generally by the numeral 10. With reference first to Fig. 2 it will be seen that the numeral 12 designates a sector-shaped recess which is drilled in the ball, the bottom of the recess being denoted at 14 and the open or mouth portion of the recess opening through the peripheral surface 16 of the ball. Fitting in the recess against one lengthwise wall thereof is a sector-shaped plate 18 of requisite material the inner surface of which is preferably milled or serrated as at 20. Adjacent the upper end this plate is provided on its interior side with an arcuate keying groove 22 which serves to accommodate a correspondingly arcuate keying rib 24 (Fig. 7) on the side 26 of the slidable thumb block 28. This block is of general rectangular form. On the end or side 30 opposite 26 there is an outstanding flange 32 which as shown in Fig. 4 constitutes a shoulder and rests in the rabbet 36 provided therefor. The exterior surface of the flange 32 is flush with the surface of the ball.

With further reference to Fig. 4 it will be noticed that on the same side the recess is provided with an end thrust plate 38 against which the surface 30 is pushed or shoved in a manner to be hereinafter described. Centrally the block is provided with a bore 40 which is in turn provided at its bottom with an endless ledge or stop 42. (Fig. 4.)

This bore is standardized to accommodate the insertable and removable sleeve or thumb stall 42. The thumb hole or passage 44 in this sleeve or thumb stall is of prerequisite size or gauge. That is to say, in practice any number of finger stalls or sleeves will be provided and removed and inserted to accommodate each particular customer's needs. Also, each stall is provided around its exterior and near the top with an endless keeper groove 46 which is perhaps best shown in Fig. 6. Further considering this groove and with reference to Fig. 6 attention is directed to a bore 48 in the block which accommodates a latch bolt the upper operating end of which 50 extends above the bore. The bolt in turn is provided with a keyway 52 in one side to accommodate the setscrew 54 which holds the latch bolt in place and yet allows it to slide. The latch bolt is spring-biased by way of a coil spring 56 fitting into a socket portion of the bolt. The median portion of the bolt is provided with an endless groove 58 to accommodate the ball detent 60. The ball detent, when in the position seen in Fig. 6, fits into the keeper groove 46 and prevents displacement of the sleeve or thumb stall in an obvious manner. By pushing the latch bolt down and registering the keeper groove 58 with the ball 60 the stall or sleeve is then unlocked so to speak and may be withdrawn. It may be added too as shown in Fig. 7 that this sleeve is provided along one vertical side with a rib 62 which keys the sleeve in the bore 40 against rotation.

With reference now to Fig. 4 it will be evident that the block 28 is sandwiched and held between the milled friction detent plate 18 on one side and the opposed plate 38 on the other side, both plates being suitably fitted and retained in the recess 12. However, it is preferred that the plate 18 be provided below the center with a depression 64 into which a retaining screw-end of a screw 66 is fitted. The screw 66 is threaded and held in place by way of a threaded bushing 68 threaded into a hole provided therefor in the ball. The numeral 70 designates a locking screw for the screw 66. These two screws serve to prevent accidental displacement of the plate 18 just in case one accidentally unscrews the adjusting detent setscrew 72 too far. This setscrew is provided with a knurled finger-grip 74 and the threaded shank is screwed into a bushing 76. The end of the screw is engageable with another depression 78 provided in the plate 18.

With reference now to the lock for the regulatable finger stalls it is perhaps convenient to refer first to Fig. 5 wherein it will be seen that the generally circular well or recess 80 has its wall provided with a metal liner or cylinder 82 which provides for the encircled rotary block 84. This block as seen in Fig. 5 is provided around its periphery with an endless groove 86. There is a friction brake shoe 88 provided and this is adapted to be forced into the groove to lock the block against rotation whenever desired. This is accomplished as best shown in Fig. 2 by way of a setscrew 90 which is operably mounted in a bushing 92 provided therefor. The end of the screw engages the shoe and forces the shoe into the groove and against the block so that when the screw is suitably tightened the block is locked against rotation. Also as seen in Fig. 2 the block 84 has dual passages or bores therein to accommodate the inserts or finger sleeves, also referred to as stalls. The bore means is referred to generally by the numeral 94 and is of the construction seen in Fig. 5. Also at the bottom of the bore there is a flange or shoulder 96. The upper part of the block also rests upon a ledge or shoulder 98. The two finger stalls or sleeves are denoted by the numerals 99 and 100 as seen in Fig. 8. The sleeves are provided with bevelled or tapered lower end portions 102 and opposed flat faces 104 which butt together in mating relationship as seen in Fig. 5 and thus prevent relative rotation of the stalls. The finger holes are denoted each by the numeral 106. Here again the sleeves have finger holes of a predetermined size or diameter and they are selectively picked out before insertion in the block to fit the particular user's needs. The upper half portion of each stall is provided with a keeper groove 107 and these grooves serve to accommodate an elongated bullet-like detent 108 (Fig. 2) which is cooperable with the keeper groove 110 in the spring-biased latch bolt 112 held in place for operation by a setscrew 114.

It is evident from the description thus far that the thumb accommodation means is characterized by the pocket-like cavity or recess 12 and the shiftably slidable thumb block 28 keyed in place by way of rib 24 and accompanying keying groove 22. When one desires to do so the block is locked against movement in the desired position by way of the aforementioned setscrew 72. Tightening the setscrew (Fig. 4) forces the milled plate 18 against the block and the block in turn against the end thrust plate 38 and the block is bound in a locked position. The position which the block takes after the adjustment is made is determined by the calibrated scale A in Fig. 1. Any suitable index may be provided on the flange 32 to cooperate with the graduations of the scales. Whatever the measurement is the result is taken down and used for recording purposes. A similar scale B is provided around the margin of the finger-accommodating means and here again a suitable index on the rotary block cooperates with the graduations of the scale so that the position of the block and the fingers stalls therein may be measured and the measurement taken down. These measurements in turn are used as a pattern for a specially drilled or custom-made bowling ball for the person whose measurements have been taken with the aid of the facilities provided in this measuring ball 10. All of the sleeves or stalls are insertable and removable in respect to their respective blocks. The same latch means seen in Fig. 6 is employed to keep the sleeves in their intended position and against displacement.

It will be evident that the invention is characterized generally and broadly speaking by a hard rubber ball blank which has been machined out to hold two significant cooperating devices; namely the sliding thumb block and the companion rotary accommodating block for the fingers. The thumb and finger sleeves are structurally or physically according to the ones illustrated in the drawings. However, it is to be kept in mind that while the outside dimension of the sleeves is such as to fit into their respective socketed blocks, the holes in the sleeves vary in cross-sectional dimension to meet the requirements of the fingers and thumbs of those who use the improved ball for testing and measuring purposes. The sleeves are generally made from aluminum and set and keyed into the sliding thumb and rotating finger block at a designated pitch. When the hand is inserted into the proper sized thumb and finger sleeves with the latter in place in their respective blocks and the ball is gripped, the thumb block slides toward and from the finger block. This accomplishment allows easy fitting of the user's desired or needed hand span. It is also to be kept in mind that the slidable thumb block despite the fact that it slides back and forth always maintains the same pitch from the center of the ball which is, of course, important in arriving at the desired measurement. When the hand is applied and the ball is gripped and the sliding movement of the thumb block comes into play, the fingers rotate as the ball is gripped and the fingers come to rest at whatever position seems most natural and comfortable for the user. After preliminary gripping of the ball the span width and fingers position can be locked in place by the setscrews. The trial ball can then be picked up and swung with ease in a manner similar to actual bowling. The result is that the measurements then given by way of the provided graduated scales may be utilized as a basis or "blueprint" for drilling corresponding or duplicated fingers and thumb holes in a new ball.

The invention is believed to be distinctively different from others currently in use and on the market in that it is characterized by the sliding thumb block which always maintains the same pitch regardless of the hand's span. This feature in conjunction with the particular location of the detent means for locking the same is novel enabling rapid and accurate measurement scale reading without disturbing the grip of the user to lock the thumb block. Each individual measurement can be fastened or locked and the ball picked up and swung for suitability.

The thumb reference scale represents the distance measured in degrees of 1/16 of an inch, the center of the thumb hole being relative to a line drawn through the center of the two finger holes and perpendicular in relation to the center line of the ball. The finger drilling angle reference scale represents the number of degrees a line drawn through the center of the finger holes is off the center line of the ball. The measurements taken and recorded may be used for future reference needs or sent mail order to the place where the new ball is to be drilled. All hole sizes, spans and angles of finger holes in relation to the thumb hole are a matter of unit measurement which can be relocated in a grip ball for duplication purposes.

With further reference to Fig. 2 it will be seen that the spring biased latch bolt 112 is keyed in place (see the latch bolt 50 and features 52 and 54) in the same manner as is detailed in Fig. 6.

It is further to be explained that the rotary block 84 (Fig. 9) is suitably provided with an appropriate spider-like stop 109 at the cooperating end portion of the bullet-like detent to keep the latter from sliding out of place when the stalls 99 and 100 (with which it is normally engaged) have been withdrawn or removed.

The foregoing is considered as illustrative only of the principles of the invention. Further, since numerous modifications and changes will readily occur to those skilled in the art it is not desired to limit the invention to the exact construction and operation shown and described, and accordingly all suitable modifications and equivalents may be resorted to, falling within the scope of the invention as claimed.

What is claimed as new is as follows:

1. A bowling ball grip measuring device comprising a dummy bowling ball, finger stall means disposed in said ball and bisected by a diametral plane through said ball, span measuring slide means bisected by said diametral plane and slidably disposed in recess means formed within said ball in spaced relation to said finger stall means, said slide means being adjustably slidable along said diametral plane toward and away from said finger stall means in said recess means, thumb stall means disposed in said slide means and detent means operatively connected to said slide means and disposed in said ball and extending into said recess means, said detent means extending laterally outwardly from said ball and away from said diametral plane for locking said slide means in adjusted position relative to the ball.

2. The device as defined in claim 1, wherein said recess means includes parallel sides disposed parallel to said diametral plane, scale means disposed on an outer surface of said ball at one side of said recess means and said detent means being engageable with said slide means through the other side of said recess means.

3. The device as defined in claim 2 wherein said detent means includes a serrated friction plate disposed between said other side of the recess means and the slide means and axially adjustable screw means engageable with said friction plate disposed perpendicular thereto and extending laterally therefrom out of the ball.

4. The device as defined in claim 3, wherein said finger stall means includes a pair of removable finger inserts having opposed abutting flat faces disposed in said diametral plane, and said thumb stall means includes a removable thumb insert disposed in said slide means, said finger inserts and thumb insert being respectively retained within the ball and slide means by insert detent means.

References Cited in the file of this patent

UNITED STATES PATENTS

| | | |
|---|---|---|
| 2,207,404 | Hinkley | July 9, 1940 |
| 2,314,811 | Akin | Mar. 23, 1943 |
| 2,393,026 | Dietz | Jan. 15, 1946 |
| 2,539,918 | McLaren | Jan. 30, 1951 |
| 2,566,511 | Bassi | Sept. 4, 1951 |
| 2,709,853 | Rassner | June 7, 1955 |